United States Patent
Byun et al.

(10) Patent No.: US 9,923,615 B2
(45) Date of Patent: Mar. 20, 2018

(54) METHOD AND APPARATUS FOR TRANSMITTING FEEDBACK SIGNALS

(71) Applicant: LG ELECTRONICS INC., Seoul (KR)

(72) Inventors: Ilmu Byun, Seoul (KR); Hyunsoo Ko, Seoul (KR); Kungmin Park, Seoul (KR); Heejeong Cho, Seoul (KR); Hyeyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/325,069

(22) PCT Filed: Jul. 24, 2014

(86) PCT No.: PCT/KR2014/006746
§ 371 (c)(1),
(2) Date: Jan. 9, 2017

(87) PCT Pub. No.: WO2016/013698
PCT Pub. Date: Jan. 28, 2016

(65) Prior Publication Data
US 2017/0163318 A1    Jun. 8, 2017

(51) Int. Cl.
*H04B 7/00* (2006.01)
*H04B 7/0417* (2017.01)
*H04B 7/0452* (2017.01)
*H04B 7/06* (2006.01)
*H04B 10/50* (2013.01)
*G01S 3/72* (2006.01)

(52) U.S. Cl.
CPC .............. *H04B 7/0417* (2013.01); *G01S 3/72* (2013.01); *H04B 7/0452* (2013.01); *H04B 7/0617* (2013.01); *H04B 10/5055* (2013.01)

(58) Field of Classification Search
CPC ..... G01S 3/72; H04B 10/5055; H04B 7/0417; H04B 7/0452; H04B 7/0617
USPC ....... 455/509, 517, 562, 561, 434, 422, 424, 455/25, 73, 129, 522, 452.2; 370/329, 370/336, 328; 713/156
See application file for complete search history.

(56) References Cited

U.S. PATENT DOCUMENTS

| | | | | |
|---|---|---|---|---|
| 3,949,955 A | * | 4/1976 | Sykes | .................. F41G 7/22 244/3.19 |
| 5,966,670 A | * | 10/1999 | Keskitalo | ................ H04B 1/76 455/434 |
| 9,680,537 B2 | * | 6/2017 | Inoue | .................. H04B 7/0456 |
| 2003/0153361 A1 | * | 8/2003 | Mori | ..................... H01Q 1/246 455/562.1 |
| 2010/0303034 A1 | | 12/2010 | Chen et al. | |

(Continued)

FOREIGN PATENT DOCUMENTS

WO    2013100565    7/2013

*Primary Examiner* — Tan H Trinh
(74) *Attorney, Agent, or Firm* — Lee Hong Degerman Kang Waimey

(57) ABSTRACT

Provided are a method and an apparatus for generating and transmitting feedback signals for a plurality of reference signals having different directionality, in a wireless communication system. A terminal may receive the plurality of reference signals having different directionality, and transmit, to a transmission end, a feedback signal including a beam index which indicates one of the plurality of reference signals.

9 Claims, 16 Drawing Sheets

(56) References Cited

U.S. PATENT DOCUMENTS

| | | | |
|---|---|---|---|
| 2011/0065448 A1 | 3/2011 | Song et al. | |
| 2011/0170498 A1* | 7/2011 | Liu | H04L 5/0053 370/329 |
| 2011/0177823 A1* | 7/2011 | Miao | H04B 7/155 455/450 |
| 2011/0274026 A1* | 11/2011 | Huang | H04J 11/0069 370/312 |
| 2012/0151207 A1* | 6/2012 | Zhao | H01Q 1/246 713/156 |
| 2013/0003672 A1* | 1/2013 | Dinan | H04L 1/00 370/329 |
| 2013/0051356 A1* | 2/2013 | Hong | H04L 27/2602 370/329 |
| 2013/0059619 A1* | 3/2013 | Kim | H04W 72/046 455/509 |
| 2013/0343303 A1* | 12/2013 | Kim | H04B 7/0452 370/329 |
| 2014/0044044 A1 | 2/2014 | Josiam et al. | |
| 2014/0112289 A1* | 4/2014 | Kim | H04W 16/14 370/329 |
| 2015/0264583 A1* | 9/2015 | Sundstrom | H04W 16/28 342/373 |
| 2016/0006122 A1* | 1/2016 | Seol | H04B 7/0408 342/372 |
| 2016/0080058 A1* | 3/2016 | Kang | H04B 7/0617 370/329 |
| 2016/0149629 A1* | 5/2016 | Zhang | H04L 1/0026 370/329 |
| 2016/0338050 A1* | 11/2016 | Kim | H04L 5/0051 |

* cited by examiner $X = \lceil \log_2(k) \rceil$ bits

000000# METHOD AND APPARATUS FOR TRANSMITTING FEEDBACK SIGNALS

CROSS-REFERENCE TO RELATED APPLICATIONS

This application is the National Stage filing under 35 U.S.C. 371 of International Application No. PCT/KR2014/006746, filed on Jul. 24, 2014, the contents of which are hereby incorporated by reference herein in its entirety.

BACKGROUND OF THE INVENTION

Field of the Invention

The present invention relates to a method and apparatus for transmitting a feedback signal, and more particularly, to a method and apparatus for transmitting a feedback signal of a terminal for receiving a plurality of beams having different directivity.

Related Art

Recently, commercialization of a long term evolution (LTE) system which is a next-generation wireless communication system has been supported earnestly. After recognizing necessity for supporting not only a voice service but also a large amount service with high quality in response to a user's demand while ensuring activity of a user of a terminal, the LTE system tends to be more rapidly increased than before. The LTE system provides a low transmission delay, a high transfer rate, and an improved system capacity and coverage.

With an introduction of such a high-quality service, there is a rapidly growing demand on a wireless communication service. Above all, capacity of a communication system must be increased to actively cope with this situation. A method of newly discovering an available frequency band and a method of increasing efficiency for a limited resource may be considered as an alternative of increasing communication capacity in a wireless communication environment.

As the method of increasing the efficiency for the limited resource, a so-called multi-antenna transmission/reception technique is actively developed in recent years with a remarkable attention, in which a spatial region for resource utilization is additionally ensured by placing a plurality of antennas to a transceiver to obtain a diversity gain or in which transmission capacity is increased by transmitting data in parallel through the respective antennas.

In a multi-antenna system, beamforming and precoding may be used as a method of increasing a signal to noise ratio (SNR). The beamforming and the precoding are used to maximize the SNR through feedback information in a closed-loop system capable of using the feedback information in a transmitting end.

Meanwhile, although an increase in the number of antennas can lead to an increase in an average signal to interference plus noise ratio (SINR) of a cell-edge terminal by decreasing an interference occurrence probability, there is a problem in that the worst SINR cannot be improved occasionally.

SUMMARY OF THE INVENTION

The present invention provides a method for decreasing an interference occurrence probability when beamforming is performed by using multiple antennas, and for generating a guidance beam for accurate channel prediction.

According to an embodiment of the present invention, a method of transmitting a feedback signal may include: receiving a plurality of reference signals having different directivity; and transmitting a feedback signal including a beam index indicating any one of the plurality of reference signals.

According to another embodiment of the present invention, a method of transmitting a reference signal may include: generating a plurality of reference signals having different directivity; receiving a feedback signal for a beam index indicating any one of the plurality of reference signals; and adjusting a direction of the plurality of reference signals according to the received beam index.

According to the present invention, accurate channel prediction and interference control are possible when beamforming is achieved by using multiple antennas.

In addition, according to the present invention, a terminal which receives a plurality of beams can generate a feedback signal for interference avoidance and interference prediction.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station is generally a fixed station that communicates with the wireless device and may be referred to as another terminology, such as an evolved node-B (eNB), a base transceiver system (BTS), an access point, etc.

Hereinafter, the present invention is applied based on a 3$^{rd}$ generation partnership project (3GPP) long term evolution (LTE) or a 3GPP LTE-Advanced (LTE-A). This is for exemplary purposes only, and thus the present invention is applicable to various communication systems. In the following description, LTE and/or LTE-A are collectively referred to as LTE.

The present specification is described based on a communication network. A task achieved in the communication network may be achieved in a process of controlling a network and transmitting data in a system (e.g., a base station) for managing the communication network, or the task may be achieved in a terminal linked to the network.

The technology described below applies to a multiple antenna system or a multiple-input multiple-output (MIMO) system using multiple transmit (Tx) antennas and at least one receive (Rx) antenna. The technology described below may apply to various MIMO schemes. The MIMO scheme includes spatial diversity in which the same stream is transmitted to multiple layers and spatial multiplexing in which multiple streams are transmitted to multiple layers. When the multiple streams are transmitted to a single user in the spatial multiplexing, it is called single user-MIMO (SU-MIMO) or spatial division multiple access (SDMA). When the multiple streams are transmitted to multiple users in the spatial multiplexing, it is called multi user-MIMO (MU-MIMO). According to whether feedback information reported from each user is used or not, the spatial diversity and the spatial multiplexing can be classified into an open-loop scheme and a closed-loop scheme.

A receiver needs to estimate a channel in order to recover data transmitted from a transmitter. Channel estimation is a process of recovering a transmission signal by compensating for signal distortion in an environment where a rapid change occurs due to fading. In general, channel estimation requires a reference signal or a pilot known to both the transmitter and the receiver. The reference signal is a signal used for channel estimation or data demodulation, and is also called a pilot.

Figure 1:
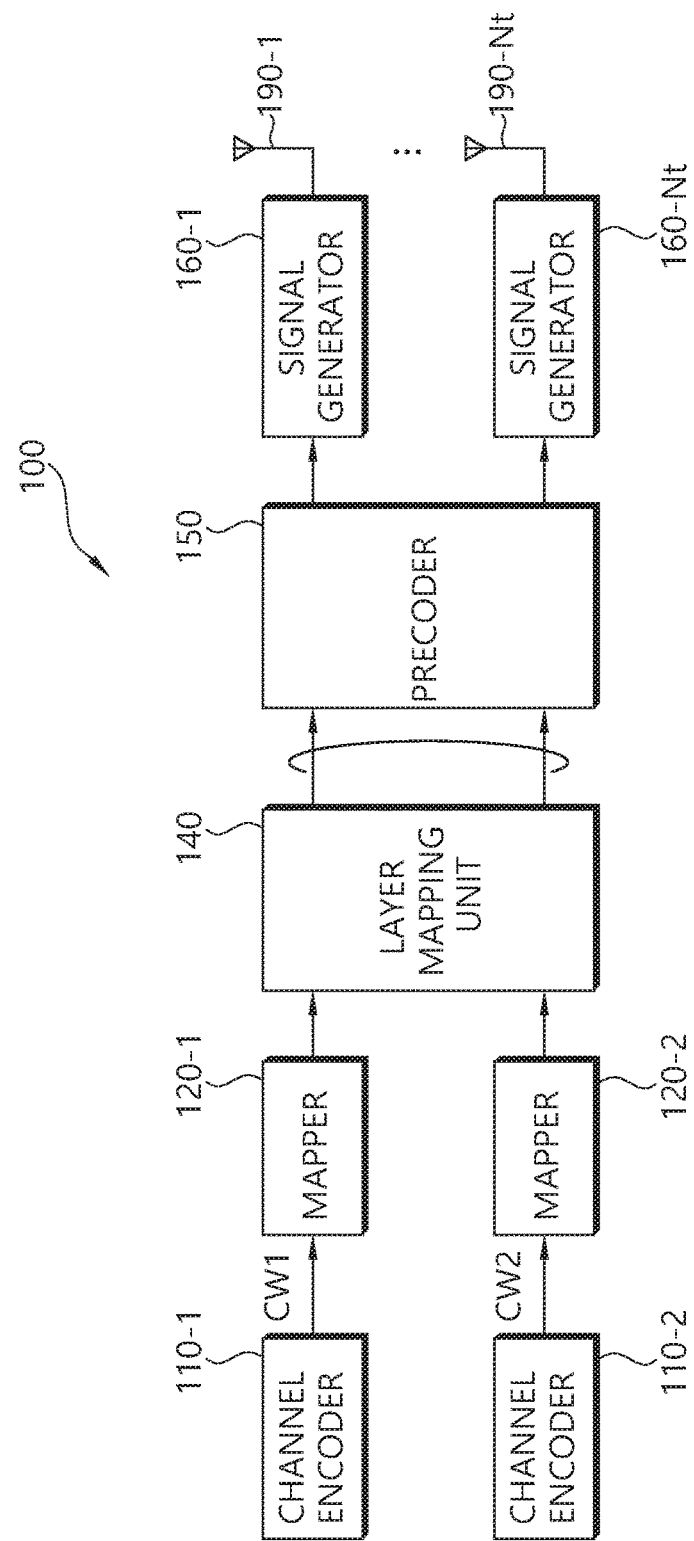
FIG. 1 is a block diagram of a transmitter having multiple antennas.

FIG. 1 is a block diagram of a transmitter having multiple antennas according to an embodiment of the present invention.

Referring to FIG. 1, a transmitter 100 includes channel encoders 110-1 and 110-2, mappers 120-1 and 120-2, a layer mapping unit 140, a precoder 150, and signal generators 160-1, ..., 160-Nt. Nt denotes the number of antenna ports.

The channel encoders 110-1 and 110-2 encode input information bits according to a predetermined coding scheme to generate codewords. The first channel encoder 110-1 generates a first codeword CW1, and the second channel encoder 110-2 generates a second codeword CW2.

The mappers 120-1 and 120-2 modulate the respective codewords according to a modulation scheme and then map the modulated codewords to modulation symbols having a demodulation value. There is no restriction on the modulation scheme. The modulation scheme may be m-phase shift keying (m-PSK) or m-quadrature amplitude modulation (m-QAM). For example, the m-PSK may be binary-PSK (BPSK), quadrature-PSK (QPSK), or 8-PSK. The m-QAM may be 16-QAM, 64-QAM, or 256-QAM. The first mapper 120-1 generates modulation symbols for the first codeword CW1. The second mapper 120-2 generates modulation symbols for the second codeword CW2.

Herein, although the transmitter 100 includes the two channel encoders 110-1 and 110-2 and the two mappers 120-1 and 120-2 to process the two codewords, the number of channel encoders and the number of mappers included in the transmitter 100 are not limited thereto. The transmitter 100 may include at least one channel encoder and at least one mapper to process at least one codeword.

The layer mapping unit 140 maps modulation symbols of the input codewords CW1 and CW2 to each layer according to the number of layers. The layer may be an information path input to the precoder 150. The layer corresponds to a rank value. The layer mapping unit 140 may determine the number of layers (i.e., rank), and thereafter map modulation symbols of each codeword.

The precoder 150 processes a mapping symbol which is mapped to each layer by using a MIMO scheme depending on a plurality of antenna ports 190-1, ..., 190-Nt, and outputs antenna specific symbols.

The signal generators 160-1, ..., 160-Nt convert the antenna specific symbols into Tx signals. The Tx signals are transmitted through the respective antenna ports 190-1, ..., 190-Nt. The signal generators 160-1, ..., 160-Nt may perform orthogonal frequency division multiplexing (OFDM) modulation which modulates an input symbol to output an OFDM symbol, and may generate a Tx signal through an SC-FDMA modulation scheme or other schemes well-known to those skilled in the art. The signal generators 160-1, ..., 160-Nt may perform inverse fast Fourier transform (IFFT) on the input symbol when the OFDM modulation is achieved, and may further insert a cyclic prefix (CP) after performing the IFFT.

The transmitter 100 can support hybrid automatic repeat request (HARQ). In a retransmission process for the HARQ, the same layer mapping as initial transmission may be performed, or layer mapping for retransmission may be performed. Further, the transmitter 100 can support rank adaptation in which a rank is changed according to a channel condition.

Figure 2:
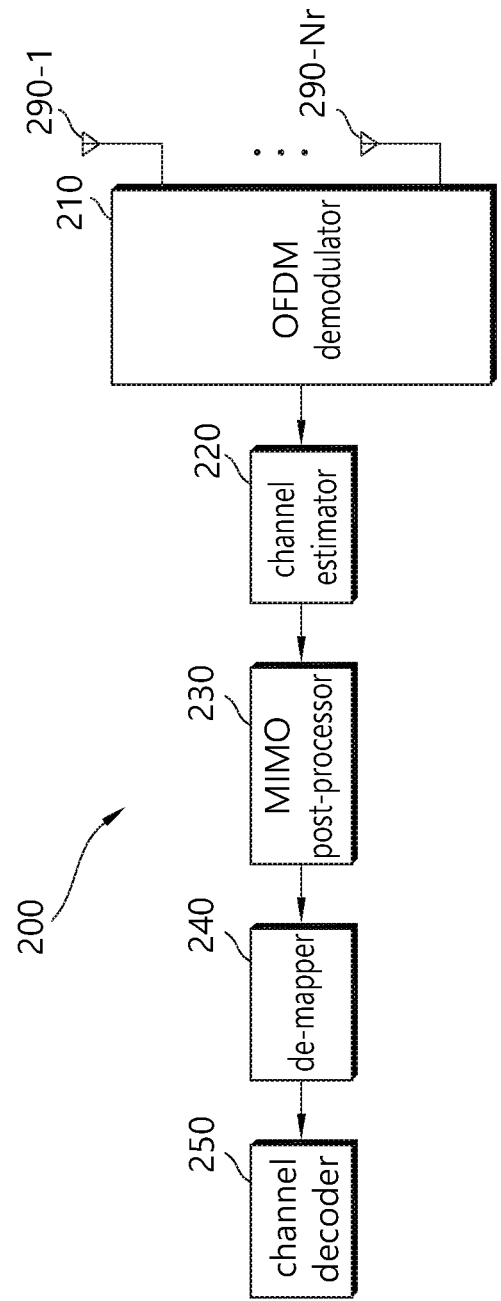
FIG. 2 is a block diagram of a receiver having multiple antennas.

FIG. 2 is a block diagram of a receiver having multiple antennas.

Referring to FIG. 2, a receiver 200 includes an OFDM demodulator 210, a channel estimator 220, an MIMO post-processor 230, a de-mapper 240, and a channel decoder 250. A signal received from receive antennas 290-1, ..., 290-Nr is subject to fast Fourier transform (FFT) by the OFDM demodulator 210. The channel estimator 220 estimates a channel by using a reference signal. The MIMO post-processor 230 performs post-processing corresponding to the MIMO processor 140. The de-mapper 240 de-maps the input symbol to a coded word. The channel decoder 250 decodes the coded word to restore original data.

Meanwhile, although a massive MIMO system is drawing attention as a core technique of a next-generation communication system such as 5G, there is a disadvantage in that a beam width is decreased when the number of antennas is increased. If the number of isotropic antennas arranged in a row is $N_T$, an interval between antennas is d, and a wavelength of a radio wave is λ, a half power beam width (HPBW) is expressed by Equation 1. The HPBW implies a beam radiation angle at which maximum power is decreased by more than half.

$$HPBW = \frac{\lambda}{(N_T - 1)d} \text{ radian} \qquad \text{[Equation 1]}$$

Equation 1 shows that the HPBW is decreased linearly according to the number of antennas. If an interval between antennas is d=λ/2, Equation 1 may be replaced by Equation 2 below.

$$HPBW = \frac{2}{(N_T - 1)} \text{ radian} \qquad \text{[Equation 2]}$$

If a distance between a base station (BS) and a user equipment (UE) is x (meter), a distance y (meter) at which a beam is spread horizontally at the point x is expressed by Equation 3.

$$y = 2x\tan\left(\frac{HPBW}{2}\right) = 2x\tan\left(\frac{1}{N_T - 1}\right) \qquad \text{[Equation 3]}$$

If the number of antennas of the BS is 4 and the distance x between the UE and the BS is 20 m and 500 m, y is 13.85 m and 346 m respectively according to Equation 3. In addition, if the number of antennas of the BS is 16 and the distance x between the UE and the BS is 20 m and 500 m, y is 2.7 m and 67 m respectively.

The smaller the value y, the narrower the beam width, and the narrower the beam width, the higher the error level based on a directional change of a beam. Therefore, more accurate beamforming is necessary, when the number of antennas is increased and the distance between the UE and the BS is decreased.

Accordingly, it is important to design a precoding matrix set for enabling accurate beamforming, when the number of antennas is increased and the distance between the UE and the BS is decreased.

Meanwhile, although an increase in the number of antennas leads to an increase in an Rx SNR at a directing point, this may also lead to an increase in interference to a neighboring cell. Due to the increase in the interference, the UE in a cell edge region may not be able to perceive an SNR gain depending on the increase in the number of antennas. An SINR of a signal received by a specific UE is expressed by Equation 4.

$$SINR = \frac{P}{I + N_0} \qquad \text{[Equation 4]}$$

In Equation 4, P denotes Rx power, and I denotes interference. Since the increase in the number of antennas leads to an increase in not only P but also I, the SINR may not be improved in the UE.

Meanwhile, when the number of antennas is increased, a beam width is decreased and thus a probability that beams overlap with each other is decreased. As a result, a probability of interference occurrence caused by the beam width is decreased. The increase in the number of antennas may lead to an increase in an average SINR of a cell-edge UE since the probability of interference occurrence is decreased, but is not enough to improve an SINR for a case where an adverse situation occurs in which beams overlap with each other.

Accordingly, the probability of interference occurrence is decreased by avoiding a beam collision in a massive MIMO system having many antennas. When a collision occurs, a reference signal needs to be arranged for channel estimation.

Hereinafter, the present invention proposes a guidance reference signal (or guidance beam) scheme for improving accuracy of channel estimation and prediction of a UE located inside a cell and for increasing an interference avoidance probability of a UE located in a cell edge.

Figure 3:
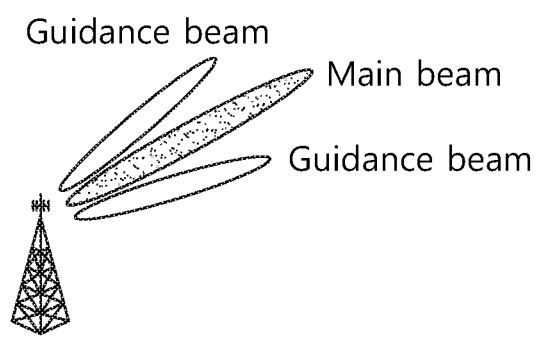
FIG. 3 illustrates a main beam and a guidance beam which are generated according to an embodiment of the present invention.

FIG. 3 illustrates a main beam and a guidance beam which are generated according to an embodiment of the present invention.

As illustrated, a BS may generate a plurality of beams having different directivity. The BS may generate a main beam in a direction originally intended, and may generate a guidance beam to have directivity different from the main beam. A directional angle of the guidance beam may be tilted so as to be tilted up, down, or to the left or right with respect to the main beam in the direction of the guidance beam.

The number of guidance beams may be at least one. For example, two guidance beams may be generated. The two guidance beams may have directivity tilted by the same angle up or down with respect to the main beam, or may have directivity tilted by the same angle to the left or right with respective to the main beam.

For convenience of explanation, a plurality of beams generated in the BS are named as a main beam and a guidance beam. However, a beam property is not divided depending on the division of the main beam and the guidance beam.

Figure 4:
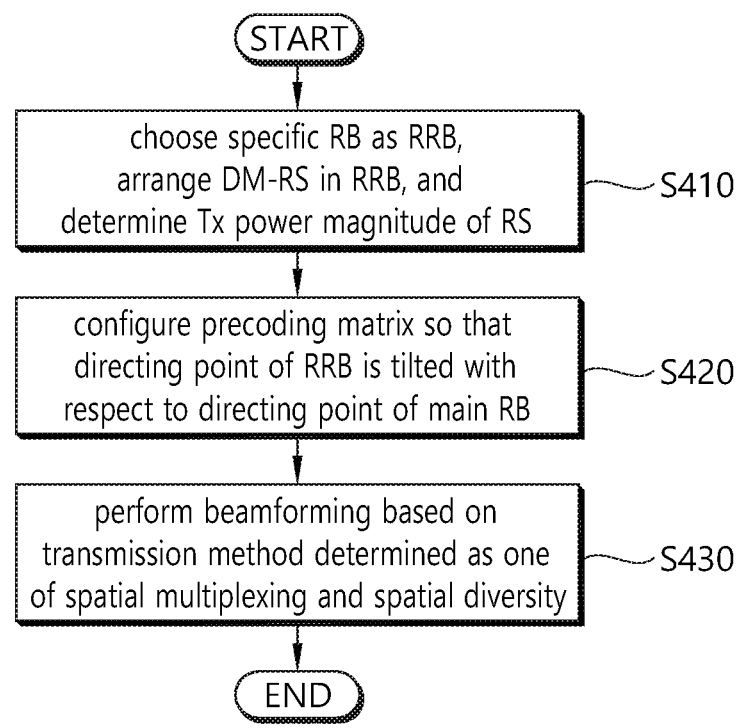
FIG. 4 is a control flowchart for a method of generating a guidance beam according to an embodiment of the present invention.

FIG. 4 is a control flowchart for a method of generating a guidance beam according to an embodiment of the present invention.

First, a BS chooses a specific resource block (RB) as a reference resource block (RB), arranges a demodulation reference signal (DM-RS) in the reference RB, and determines a Tx power magnitude of the RS (S410).

An RB according to the present invention may imply any radio resource allocation unit used in transmission of an RS for a different beam, and the RB may be constructed of a plurality of resource elements (REs). A reference RB of the present invention implies an RB used for transmission of a guidance beam.

According to an embodiment of the present invention, two or more DM-RSs may be arranged in a reference RB. The two or more DM-RSs may have an orthogonal or quasi-orthogonal feature.

According to another embodiment of the present invention, the number of DM-RSs may be 1. In this case, one DM-RS is formed with a time difference, and may have a different directing point.

In the reference RB, an orthogonal DM-RS or a quasi-orthogonal DM-RS may be arranged in various manners. The same DM-RS sequence or different DM-RS sequences may be transmitted through different REs. The same DM-RS sequence or different DM-RS sequences may be transmitted through one RE.

The plurality of DM-RSs can be transmitted through the same RE because the guidance beam is transmitted by being directed in different directions to perform channel prediction and interference prediction.

If the number of Tx antennas is $N_T$ and the number of Rx antennas is $N_R$, a Tx signal vector $x \in \mathbb{C}^{N_T \times L}$ according to the present invention may be expressed by Equation 5 below.

$$x = ws = w\begin{bmatrix}s_1 \\ \vdots \\ s_L\end{bmatrix} = [w_1, w_2, \ldots, w_L]\begin{bmatrix}s_1 \\ \vdots \\ s_L\end{bmatrix} \qquad \text{[Equation 5]}$$

In Equation 5, W is $w \in \mathbb{C}^{N_T \times L}$ as a precoding matrix, and $s = [s_n, \ldots s_L]^T$ indicates a symbol. L indicating a rank may be expressed by $L \in \{2, \ldots, \min(N_T, N_R)\}$. $W_{i,j}$ denotes an i-th row and a j-th column of $w \in \mathbb{C}^{N_T \times L}$.

Figure 5:
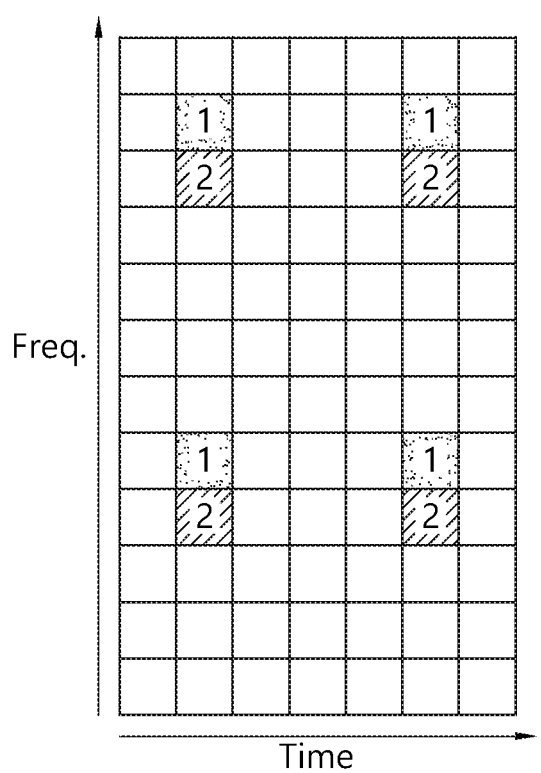
FIG. 5 illustrates a reference resource block (RB) according to an embodiment of the present invention.

FIG. 5 illustrates a reference RB according to an embodiment of the present invention. According to the present embodiment, different DM-RSs are arranged to different REs.

Equation 6 below explains a precoding matrix for the DM-RS of FIG. 5.

$$\begin{array}{cccc} & \text{Antenna} & \text{Antenna} & \text{Antenna} \\ & \text{Port 1} & \text{Port 2} & \cdots & \text{Port } L \\ \boxed{\phantom{1}} & \sum_{j=1}^{K} w_{1,j} s_j & \sum_{j=1}^{K} w_{2,j} s_j & \cdots & \sum_{j=1}^{K} w_{L,j} s_j \\ \boxed{1} & w_{1,1} R_1 & w_{2,1} R_1 & \cdots & w_{L,1} R_1 \\ \boxed{2} & w_{1,2} R_2 & w_{2,2} R_2 & \cdots & w_{L,2} R_2 \\ \vdots & \vdots & \vdots & & \vdots \\ \boxed{K} & w_{1,K} R_K & w_{2,K} R_K & \cdots & w_{L,K} R_K \end{array} \quad \text{[Equation 6]}$$

As shown in FIG. 5, two different DM-RSs are arranged to different REs located on a frequency axis adjacent to the same time axis. In Equation 6, K denotes the number of independent guidance beams.

In FIG. 5, a directing point of DM-RS($R_1$) transmitted through an RE marked by "1" may be determined as a precoding matrix expressed by $w = [w_{1,1}, w_{2,1}, \ldots, w_{L,1}]^T$, and a directing point of DM-RS($R_2$) transmitted through an RE marked by "2" may be determined by a precoding matrix expressed as $w = [w_{1,2}, w_{2,2}, \ldots, w_{L,2}]^T$.

In FIG. 5, a symbol other than the DM-RS is allocated to an RE to which no numeric number is marked.

Figure 6:
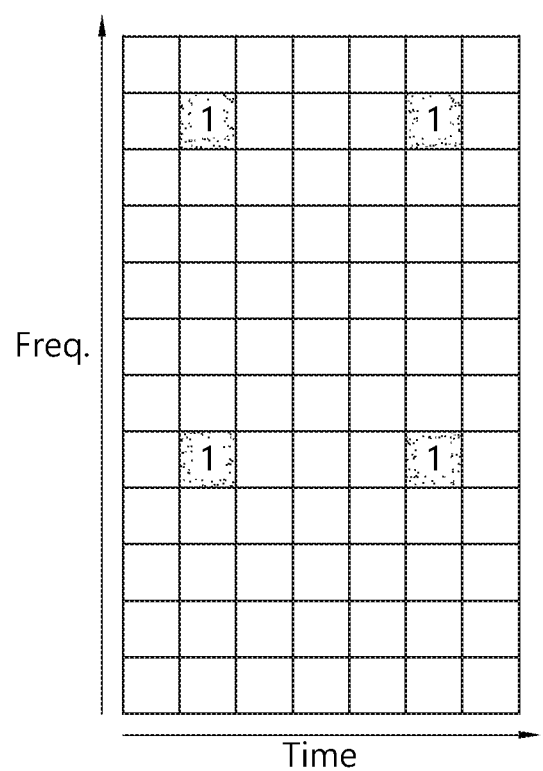
FIG. 6 illustrates a reference RB according to another embodiment of the present invention.

FIG. 6 illustrates a reference RB according to another embodiment of the present invention. According to the present embodiment, a plurality of DM-RSs may be arranged to the same RE.

A method of transmitting an orthogonal DM-RS sequence or a quasi-orthogonal DM-RS sequence by using the same RE may be used when the number of symbols to be transmitted simultaneously in practice is less than the number of guidance beams which use the reference RB.

As shown in FIG. 6, if the DM-RS for the plurality of guidance beams is transmitted by using one symbol, a precoding matrix may be expressed by Equation 7.

$$\begin{array}{cccc} & \text{Antenna} & \text{Antenna} & \text{Antenna} \\ & \text{Port 1} & \text{Port 2} & \cdots & \text{Port } L \\ \boxed{\phantom{1}} & \sum_{j=1}^{K} w_{1,j} s_1 & \sum_{j=1}^{K} w_{2,j} s_1 & \cdots & \sum_{j=1}^{K} w_{L,1} s_1 \\ \boxed{1} & \sum_{j=1}^{K'} w_{1,j} R_j & \sum_{j=1}^{K} w_{2,j} R_j & \cdots & \sum_{j=1}^{K} w_{L,j} R_j \end{array} \quad \text{[Equation 7]}$$

As shown in Equation 7, an element for a plurality of DM-RS(Rj) is included in a precoding matrix for an RE marked by "1".

Meanwhile, according to the present invention, the reference RB may be designed to improve accuracy of channel estimation and prediction of a UE located inside a cell and to improve accuracy of interference detection of a UE located outside the cell. The following cases may be considered in the arrangement of the reference RB.

(1) If an RB of a t-th slot of a radio frame is Rt and a set of RBs assigned to a specific UE is R, a relation of Rt∈R is satisfied. Regarding Rt, the reference RB may be arranged to one or more RBs among RBs which come first and one or more RBs among RBs which come last temporally. This is to correctly recognize a channel change depending on a movement direction of the UE by utilizing the reference RB. That is, a mobility of a user can be accurately recognized by arranging the reference RB temporally with a specific interval.

Figure 7:
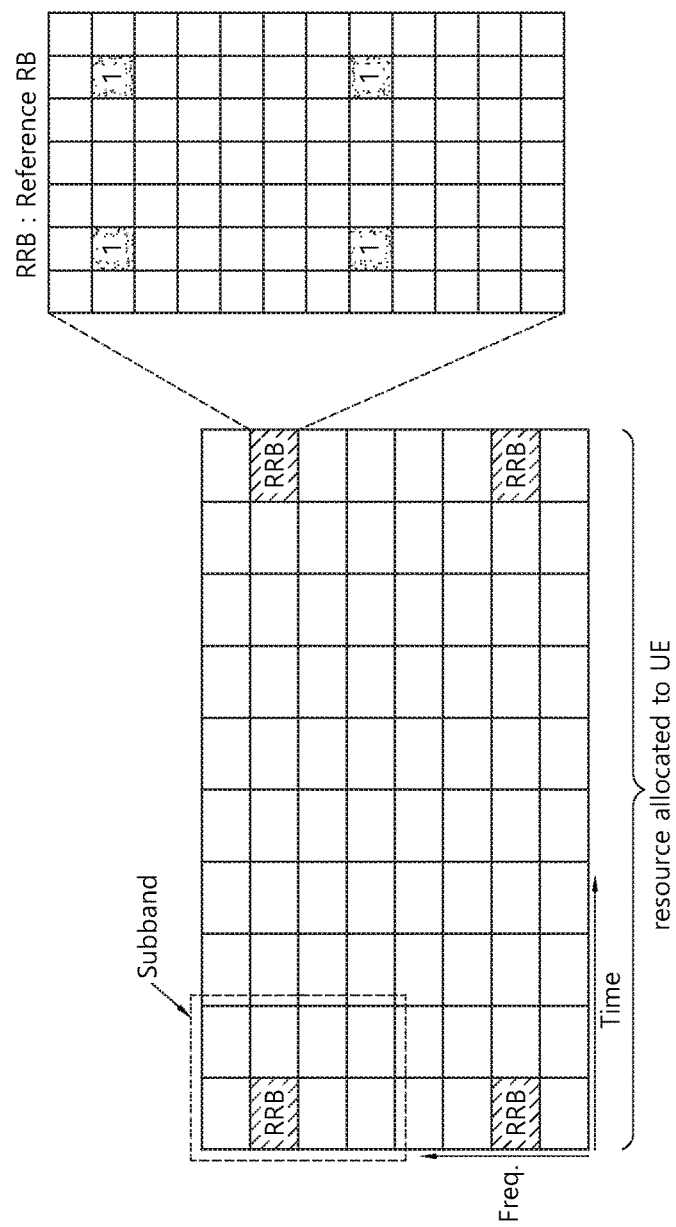
FIG. 7 illustrates a resource for arranging a reference RB according to an embodiment of the present invention.

FIG. 7 illustrates a resource for arranging a reference RB according to an embodiment of the present invention, and is an example for a resource to which the above case (1) is applied.

As shown in FIG. 7, a resource allocated to one UE may be constructed of a subband, and may be scheduled in a subband unit. One subband may be constructed of a plurality of reference RBs (RRBs), and one RRB is constructed of a plurality of REs. A reference signal "1" is arranged to 4 REs in the RRB of FIG. 7.

Among resources allocated to the UE, the RRB is arranged to an RB which comes first and an RB which comes last on a time axis.

(2) A BS may perform scheduling in a subband unit including several RBs. In this case, a location of an RRB in the subband may be cyclic-shifted on a frequency axis according to a physical cell ID. That is, an RRB allocated to a specific UE may vary depending on the cell ID.

However, the RRB may not be cyclic-shifted on a time axis. The RRB is moved on the frequency axis in order to minimize overlapping of a neighboring cell and the RRB. Further, the RRB is not moved on the time axis in order to arrange the RRB to a first RB and a last RB.

Figure 8:
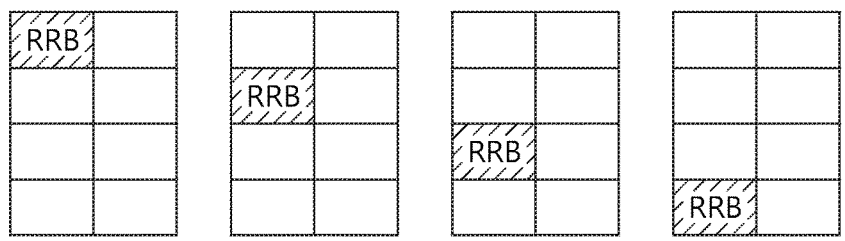
FIG. 8 illustrates a movement of a reference RB which comes first on a time axis another embodiment of the present invention.
Figure 9:
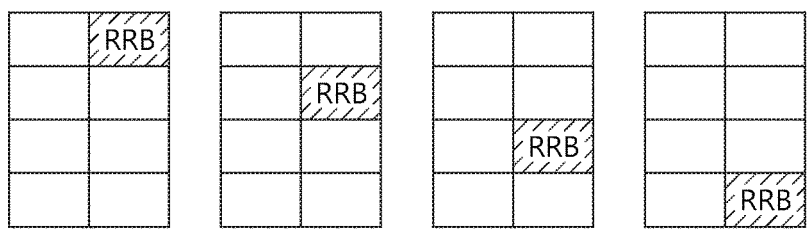
FIG. 9 illustrates a movement of a reference RB which comes last on a time axis another embodiment of the present invention.

FIG. 8 and FIG. 9 illustrate a resource for arranging an RRB according to another embodiment of the present invention, and are examples for resources to which the cases (1) and (2) are applied. In FIG. 8 and FIG. 9, an arrangement of an RRB in a subband is illustrated for a different cell ID. It is shown in FIG. 8 and FIG. 9 that 4 RBs are arranged to one slot under the assumption that the subband is constructed of two slots.

FIG. 8 illustrates a movement of an RRB which comes first on a time axis, and FIG. 9 illustrates a movement of an RRB which comes last on a time axis. In FIG. 8 and FIG. 9, subbands are illustrated as respective resources for different cell IDs, and the RRB is cyclic-shifted only on a frequency axis.

(3) According to another embodiment of the present invention, an RRB may be divided into a vertical RRB for measuring a mobility in a beam advancing direction and a horizontal RRB for measuring a mobility in a direction horizontal to the beam advancing direction, and the number of arranged horizontal RRBs and the number of arranged vertical RRBs may be determined to be different from each other. Since a BS is installed in a high place in general, the arrangement may be achieved such that the number of vertical RRBs for measuring the mobility in the beam advancing direction is less than the number of horizontal RRBs for the mobility in the horizontal direction.

For example, it is assumed that the BS is installed at a height h (meter), a distance between the BS and the UE is d (meter), and a distance by which the UE moves horizontally is x (meter). When the UE moves by x (meter) in accordance with a beam transmission direction, a beam's down tilting angle θ to be changed is expressed by Equation 8.

$$\theta = \tan^{-1}\left(\frac{h}{d}\right) - \tan^{-}\left(\frac{h}{d+x}\right) \quad \text{[Equation 8]}$$

Meanwhile, when the UE moves by x (meter) horizontally to the beam advancing direction, a beam's steering angle θ to be changed is expressed by Equation 9.

$$\theta = \tan^{-1}\left(\frac{x}{d}\right) \quad \text{[Equation 9]}$$

By utilizing Equation 8 and Equation 9, the BS may adjust the number of horizontal RRBs and the number of vertical RRBs in consideration of a diameter of a cell, a height of the BS, and a maximum movement speed or the like of the UE to be supported. The UE may provide the BS with information regarding its location or its movement speed or the like.

Figure 10:
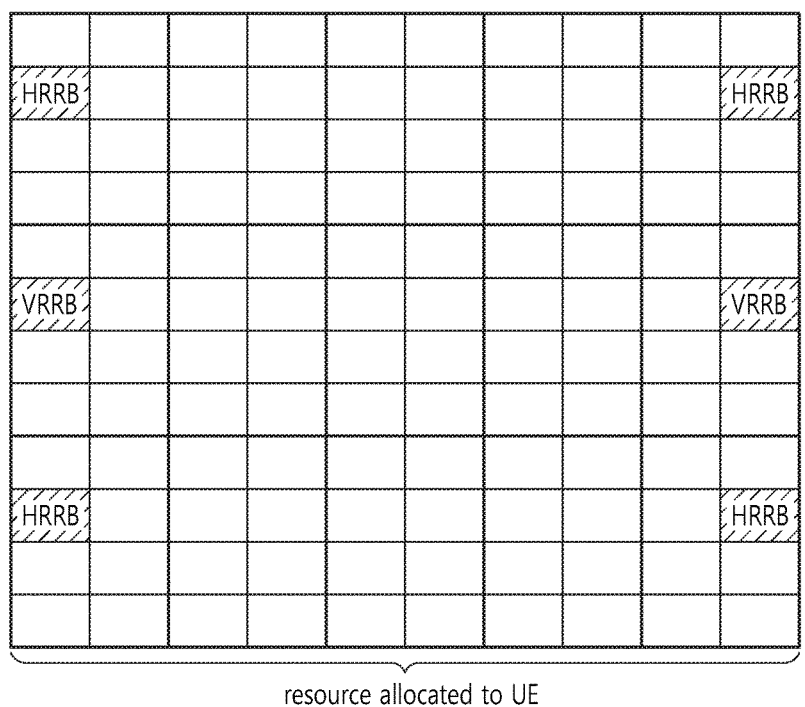
FIG. 10 illustrates a resource for arranging a reference RB according to another embodiment of the present invention.

FIG. 10 illustrates a resource for arranging an RRB according to another embodiment of the present invention, and is an example for a resource to which the cases (1) to (3) are applied. In FIG. 10, a horizontal RRB is indicated by HRRB, and a vertical RRB is indicated by VRRB. The HRRB may measure a mobility of a UE which moves in a direction orthogonal to a beam advancing direction, and the VRRB may measure a mobility of a UE which moves in the beam advancing direction.

Also, in the RRB of FIG. 10, the HRRB or the VRRB is arranged to an RB which comes first and an RB which comes last on a time axis.

(4) According to another embodiment of the present invention, a BS may perform scheduling in a subband unit in which several RBs are aggregated, and when one or more subbands are allocated to one UE, one or more RRBs may be arranged for each subband. By arranging the RRB to a minimum unit of scheduling, one or more RRBs may exist in a subband scheduled to a UE which exists in a neighboring cell.

Figure 11:
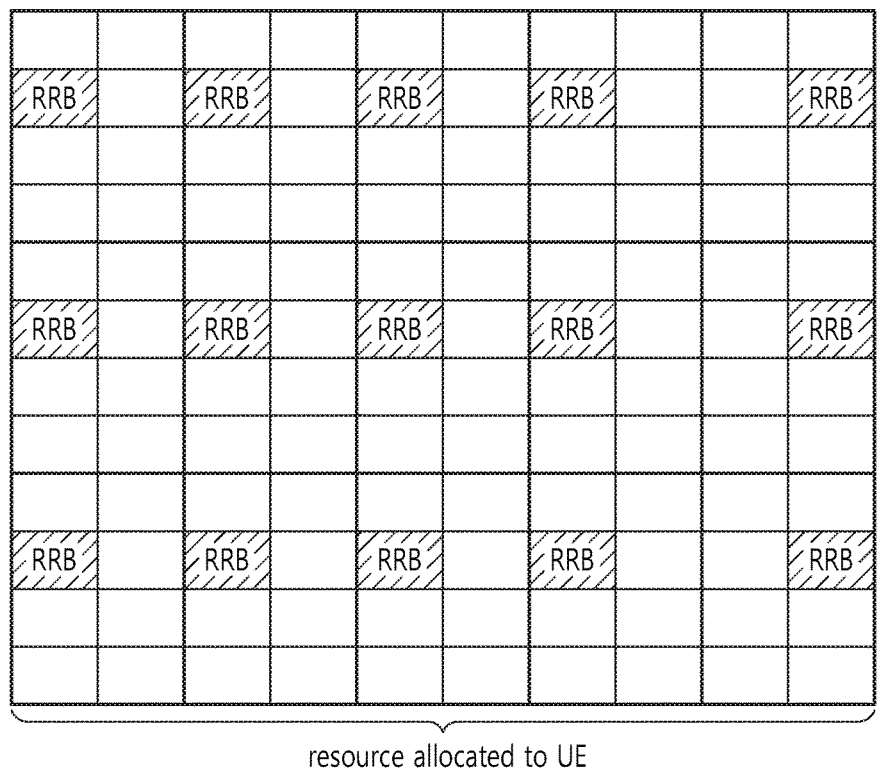
FIG. 11 illustrates a resource for arranging a reference RB according to another embodiment of the present invention.

FIG. 11 illustrates a resource for arranging an RRB according to another embodiment of the present invention, and is an example for a resource to which the cases (1), (2), and (4) are applied.

In FIG. 11, an RRB may be arranged for every one subband to be scheduled, and the RRB may be arranged at a different location according to a cell ID.

(5) Meanwhile, according to another embodiment of the present invention, the number of RRBs may be determined according to a coding rate. For example, if the number of bits of an information bit is k and the coding rate is R, a length of a codeword is k/R. In this case, up to (k/R−k) bits may be transmitted on the RRB. (k/R−k) corresponds to the number of bits of a parity bit.

Even if 1-layer beamforming is optimal, the RRB may transmit a signal by using multi-layer beamforming. If the signal is transmitted through several-layer beamforming, performance deterioration may occur. Therefore, in order to minimize this, information corresponding to the number of parity bits may be transmitted through the RRB.

According to the present invention, the arrangement of the RRB may be designed through various combinations considering at least one of the cases (1) to (5).

Returning to FIG. 4, the BS may configure a precoding matrix so that a directing point of an RRB is tilted with respect to a directing point of a main RB used for transmission of a main beam (S420). As described above, the directing point of the RRB may have directivity tilted by the same angle in practice up or down with respect to the main RS, or may have directivity tilted by the same angle in practice to the left or right with respect to the main RS.

According to the configured precoding matrix, the BS performs beamforming on the basis of a transmission method determined as one of spatial multiplexing and spatial diversity (S430). That is, the BS may generate a guidance beam through multi-layer beamforming, or may generate the guidance beam through 1-layer beamforming. However, even if the 1-layer beamforming is performed, the number of orthogonal DM-RSs may be maintained to N.

In a case where multi-layered beamforming is performed on the RRB for channel prediction and interference prediction, if an Rx signal of the UE does not have enough strength and thus there is a need to improve a transfer rate, the number of layers to be multiplexed may be decreased.

In addition, the BS may use the pre-coding matrix to perform multi-layered beamforming for simultaneously transmitting beams of which the number is less than or equal to N which is set as the number of DM-RSs. That is, since symbols of which the number is less than N are simultaneously transmitted according to a channel situation, the BS may perform beamforming on N orthogonal DM-RSs in different directions.

For this, not only information regarding the number of orthogonal DM-RSs in the RRB but also information regarding the number of symbols to be simultaneously multiplexed must be provided to the UE.

The number of orthogonal DM-RSs in the RRB and the number of symbols simultaneously multiplexed may be transmitted through a physical downlink control channel (PDCCH) or an extended physical downlink control channel (ePDCCH) of LTE. If this information is transmitted through the ePDCCH, a signal is transmitted through the ePDCCH of another RB other than the RRB.

If N is greater than 1 and the RRB is transmitted through a single-layer beam, as shown in FIG. 6, orthogonal or quasi-orthogonal DM-RS sequences may be transmitted on the same RE. With this resource arrangement, a resource waste of the RE can be decreased.

Meanwhile, upon receiving a pre-coded RRB, the UE may configure a feedback signal on the basis of channel information acquired from the RRB.

When the UE provides a variety of information to the BS, the BS may use the information to maximize performance by adjusting several system parameters such as a power level, a transmission format, or the like. Effective transmission is supported by increasing a data transfer rate when a channel state is good and by decreasing the transfer data when there is a channel deterioration. As result, an average transfer rate can be increased.

In this aspect, the UE may transmit to the BS an index of a beam having the best state among layered beams of the RRB. That is, information indicating a specific direction may be provided to the BS to report that it is effective to adjust a direction of a currently being transmitted beam to the specific direction.

For example, the UE may generate a precoding matrix index (PMI) acquired from RRBs in a subband and an index of a beam having the best directivity as a feedback signal.

Figure 12:
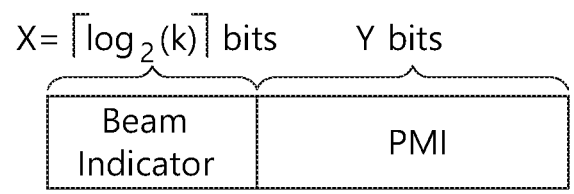
FIG. 12 illustrates a feedback signal according to an embodiment of the present invention.

FIG. 12 illustrates a feedback signal according to the present embodiment. If the number of layered beams is K, the number of bits indicating a beam index is $[\log_2(k)]$. A UE may generate X-bit information (beam indicator) indicating a beam index and Y-bit information indicating a PMI as feedback information.

Figure 13:
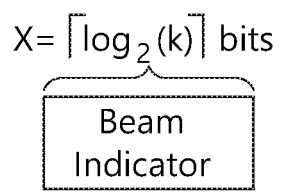
FIG. 13 illustrates a feedback signal according to anther embodiment of the present invention.

FIG. 13 illustrates a feedback signal according to anther embodiment of the present invention. As illustrated, a UE may generate feedback information by using only information indicating a beam index without having to include a PMI. If it is not a cycle for transmitting the PMI, the UE may transmit only the beam index to a BS.

Figure 14:
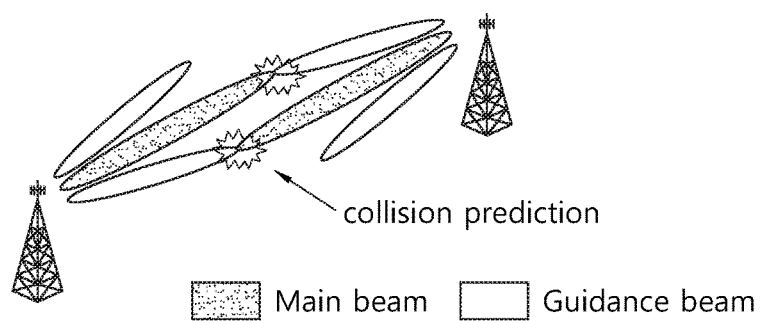
FIG. 14 illustrates prediction of interference occurrence caused by a guidance beam according to the present invention.

FIG. 14 illustrates prediction of interference occurrence caused by a guidance beam according to the present invention.

As shown in FIG. 14, if two BSs generate a plurality of beams having different directivity, a guidance beam and a main beam may collide before a collision occurs between the main beams.

When feedback information is transmitted from a UE to the BS as shown in FIG. 12 and FIG. 13, the BS may change a location of a resource allocated to a cell through scheduling. That is, the BS may adjust a directing point of a guidance beam by using beam index information. Accordingly, an inter-cell interference avoidance effect can be expected. By generating the plurality of beams having different directivity and by adjusting a directing point of the generated beam, inter-cell interference can be minimized and accuracy of a beam control can be increased in a massive MIMO system. A receiving end can also predict interference occurrence when an SINR of a specific RRB is significantly lower than an SINR of another RRB.

Figure 15:
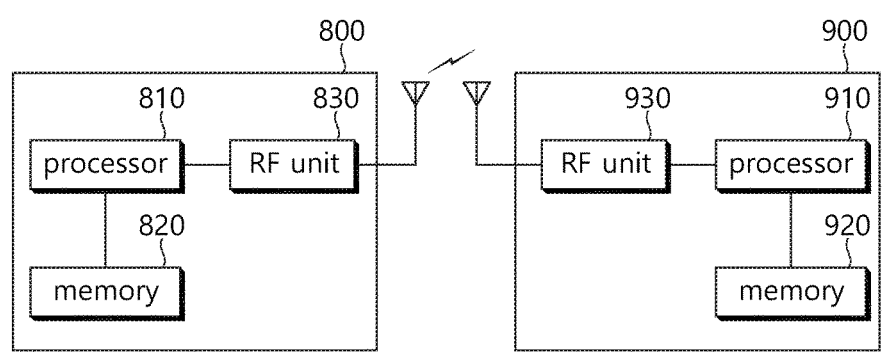
FIG. 15 is a block diagram of a wireless communication system according to an embodiment of the present invention.

FIG. 15 is a block diagram of a wireless communication system according to an embodiment of the present invention.

A BS 800 includes a processor 810, a memory 820, and a radio frequency (RF) unit 830.

The processor 810 implements the proposed functions, procedures, and/or methods. Layers of a radio interface protocol may be implemented by the processor 810. The memory 820 is coupled to the processor 810, and stores a variety of information for driving the processor 810. The RF unit 830 is coupled to the processor 810, and transmits and/or receives a radio signal.

A UE 900 includes a processor 910, a memory 920, and an RF unit 930.

The RF unit 930 receives a plurality of reference signals having different directivity, and transmits to the BS 800 a feedback signal generated in the processor 910. A reference signal to be received may include a main reference signal having first directivity and a guidance reference signal having second directivity which is directed up, down, or to the left or right with respect to the first directivity.

The processor 910 implements the proposed functions, procedures, and/or methods, that is, generates a feedback signal including a beam index indicating any one of a plurality of reference signals.

The feedback signal may further include a precoding index corresponding to a reference signal indicated by the beam index.

In addition, the processor 910 controls the RF unit 930 so that the generated feedback signal is transmitted to the BS 800.

Layers of a radio interface protocol may be implemented by the processor 910. The memory 920 is coupled to the processor 910, and stores a variety of information for driving the processor 910. The RF unit 930 is coupled to the processor 910, and transmits and/or receives a radio signal.

Figure 16:
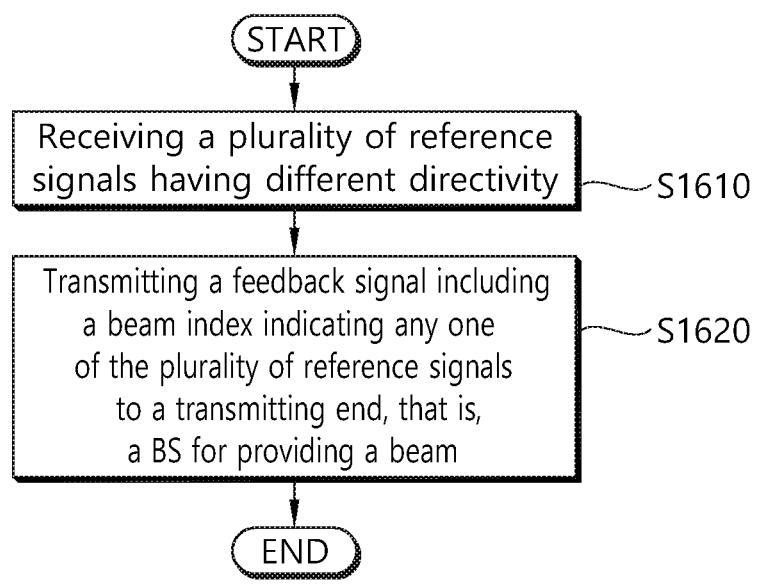
FIG. 16 is a control flowchart for feedback signal transmission according to an embodiment of the present invention.

FIG. 16 is a control flowchart for feedback signal transmission according to an embodiment of the present invention.

First, a UE receives a plurality of reference signals having different directivity (S1610).

The reference signal may be arranged at a different location in a resource allocation unit by which the reference signal is transmitted according to a cell ID, and may be arranged to the resource allocation unit separated by a specific interval on a time axis among a plurality of resource allocation units allocated to the UE.

The UE may transmit a feedback signal including a beam index indicating any one of the plurality of reference signals to a transmitting end, that is, a BS for providing a beam (S1620).

As such, according to the present invention, accurate channel prediction and interference control are possible when beamforming is achieved by using multiple antennas. For this, upon receiving a plurality of beams, the UE can generate beam index information indicating a beam as feedback information.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of transmitting a feedback signal, the method comprising:
    receiving a plurality of reference signals having different directivity; and
    transmitting a feedback signal comprising a beam index indicating a reference signal of the plurality of reference signals,
    wherein the reference signal is allocated to a resource block (RB) which comes first and a RB which comes last in a time domain,
    wherein the reference signal is scheduled by a subband, and
    wherein a location in the reference signal in the subband is cyclic-shifted in a frequency domain according to a cell identifier (ID).

2. The method of claim 1, wherein the feedback signal further comprises a pre-coding matrix index corresponding to the reference signal indicated by the beam index.

3. The method of claim 1, wherein the reference signal comprises a main reference signal having first directivity and a guidance reference signal having second directivity which is directed up, down, or to the left or right with respect to the first directivity.

4. The method of claim 1, wherein the reference signal comprises at least one vertical reference signal for measuring a mobility in a beam advancing direction and at least one horizontal reference signal for measuring a mobility in a direction horizontal to the beam advancing direction.

5. The method of claim 4, wherein a number of the at least one vertical reference signal is less than a number of the at least one horizontal reference signal.

6. An apparatus for transmitting a feedback signal in a wireless communication system, the apparatus comprising:
a radio frequency (RF) unit for transmitting and receiving a radio signal; and
a processor operatively coupled to the RF unit,
wherein the RF unit receives a plurality of reference signals having different directivity,
wherein the processor generates a feedback signal comprising a beam index indicating a reference signal of the plurality of reference signals, and instructs to the RF unit to transmit the feedback signal to a transmitting end,
wherein the reference signal is allocated to a resource block (RB) which comes first and a RB which comes last in a time domain,
wherein the reference signal is scheduled by a subband, and
wherein a location of the reference signal in the subband is cyclic-shifted in a frequency domain according to a cell identifier (ID).

7. The apparatus of claim 6, wherein the feedback signal further comprises a pre-coding matrix index corresponding to the reference signal indicated by the beam index.

8. A method of transmitting a reference signal, the method comprising:
generating a plurality of reference signals having different directivity;
receiving a feedback signal for a beam index indicating any one of the plurality of reference signals; and
adjusting a direction of the plurality of reference signals according to the received beam index,
wherein the reference signal is allocated to an resource block (RB) which comes first and an RB which comes last on a time domain,
wherein the reference signal is scheduled by a subband, and
wherein a location the reference signal in the subband is cyclic-shifted on a frequency domain according to a cell identifier (ID).

9. The method of claim 8, wherein the reference signal comprises a main reference signal having first directivity and a guidance reference signal having second directivity which is directed up, down, or to the left or right with respect to the first directivity are generated.

* * * * *